US009702787B2

(12) United States Patent
Akazaki et al.

(10) Patent No.: US 9,702,787 B2
(45) Date of Patent: Jul. 11, 2017

(54) IN-CYLINDER PRESSURE DETECTING APPARATUS FOR INTERNAL COMBUSTION ENGINE

(71) Applicants: HONDA MOTOR CO., LTD., Tokyo (JP); KEIHIN CORPORATION, Tokyo (JP)

(72) Inventors: Shusuke Akazaki, Wako (JP); Shunichi Saito, Tochigi (JP)

(73) Assignees: HONDA MOTOR CO., LTD., Tokyo (JP); KEIHIN CORPORATION, Tokyo (JP)

( * ) Notice: Subject to any disclaimer, the term of this patent is extended or adjusted under 35 U.S.C. 154(b) by 310 days.

(21) Appl. No.: 14/672,627

(22) Filed: Mar. 30, 2015

(65) Prior Publication Data
US 2015/0285710 A1    Oct. 8, 2015

(30) Foreign Application Priority Data

Apr. 2, 2014 (JP) ................................. 2014-076253

(51) Int. Cl.
G01M 15/08 (2006.01)
F02D 41/24 (2006.01)
(Continued)

(52) U.S. Cl.
CPC ........... *G01M 15/08* (2013.01); *F02D 35/023* (2013.01); *F02D 35/024* (2013.01);
(Continued)

(58) Field of Classification Search
USPC ....................................................... 73/114.16
See application file for complete search history.

(56) References Cited

U.S. PATENT DOCUMENTS 5,255,209 A    10/1993  Krebs
2007/0261482 A1*  11/2007  Mizuno ................. F02D 35/023
                                                         73/114.16
(Continued)

FOREIGN PATENT DOCUMENTS

DE    102 33 583 A1    2/2004
DE    102 41 893 A1    3/2004
(Continued)

OTHER PUBLICATIONS

German Office Action application No. 10 2015 205 917.0 issued Jun. 11, 2015.
(Continued)

Primary Examiner — Eric S McCall
(74) Attorney, Agent, or Firm — Squire Patton Boggs (US) LLP

(57) ABSTRACT

An in-cylinder pressure detecting apparatus for an internal combustion engine, for detecting an in-cylinder pressure which is a pressure in a combustion chamber of the engine. The in-cylinder pressure is detected by an in-cylinder pressure detecting block, and a motoring pressure corresponding to an in-cylinder pressure when no combustion is performed in the combustion chamber, is estimated. A peak value of the detected in-cylinder pressure is obtained as a detected pressure peak value in a predetermined operating condition of the engine. An estimated motoring pressure peak value which is a peak value of the estimated motoring pressure and corresponds to the detected pressure peak value, is calculated. The detected pressure peak value is compared with the estimated motoring pressure peak value, and sensitivity correction of the in-cylinder pressure detecting block is performed based on a result of the comparison. The predetermined operating condition is an operating condition in which an exhaust gas temperature raising control is performed for raising a temperature of exhaust gases from the
(Continued)

engine by increasing an intake air amount of the engine and retarding an ignition timing of the engine.

12 Claims, 5 Drawing Sheets

(51) Int. Cl.
    *G01L 27/00*     (2006.01)
    *F02D 35/02*     (2006.01)
    *F02D 41/02*     (2006.01)
    *F02D 41/12*     (2006.01)
    *F02D 37/02*     (2006.01)

(52) U.S. Cl.
    CPC ........ *F02D 41/2474* (2013.01); *G01L 27/005* (2013.01); *F02D 37/02* (2013.01); *F02D 41/0245* (2013.01); *F02D 41/123* (2013.01)

(56) References Cited

U.S. PATENT DOCUMENTS

| | | | |
|---|---|---|---|
| 2009/0055074 A1* | 2/2009 | Ishiguro | F02D 35/023 701/102 |
| 2014/0260574 A1* | 9/2014 | Sasaki | F02D 41/009 73/114.16 |
| 2015/0128688 A1* | 5/2015 | Bald | G01M 15/08 73/114.22 |
| 2015/0219026 A1* | 8/2015 | Urano | F02D 35/023 123/48 B |
| 2015/0226642 A1* | 8/2015 | Urano | F02D 41/009 73/114.02 |

FOREIGN PATENT DOCUMENTS

| | | |
|---|---|---|
| DE | 60 2004 004 493 T2 | 11/2007 |
| DE | 10 2007 000 294 A1 | 12/2007 |
| DE | 101 96 969 B3 | 8/2014 |
| EP | 1 109 001 A2 | 6/2001 |
| EP | 1 621 750 A1 | 2/2006 |
| EP | 2 778 379 A1 | 9/2014 |
| JP | 2002-188500 A | 7/2002 |
| JP | 2002-242750 A | 8/2002 |
| JP | 4241581 B2 | 1/2009 |
| WO | WO 2011/101984 A1 | 8/2011 |
| WO | WO 2013/069157 A1 | 5/2013 |

OTHER PUBLICATIONS

German Search Report application No. 10 2015 205 917.0 issued Jun. 10, 2015.

* cited by examiner

IN-CYLINDER PRESSURE DETECTING APPARATUS FOR INTERNAL COMBUSTION ENGINE

BACKGROUND OF THE INVENTION

Field of the Invention

The present invention relates to an in-cylinder pressure detecting apparatus for detecting an in-cylinder pressure which is a pressure in a combustion chamber of an internal combustion engine, and particularly to the in-cylinder pressure detecting apparatus which detects the in-cylinder pressure taking characteristic differences between a plurality of pressure detecting elements or amplifiers into consideration.

Description of the Related Art

International publication No. WO2011/101984 (WO '984) discloses an apparatus for estimating an in-cylinder pressure using an in-cylinder pressure sensor at an intake valve close timing (a timing at which the intake valve reaches a fully closed position). According to this apparatus, a plurality of pressure rising curves indicative of changes in the in-cylinder pressure from the intake valve close timing to a predetermined timing in the compression stroke, are obtained, a pressure rising curve that is the closest to a rising curve of the in-cylinder pressure detected by the in-cylinder pressure sensor, is selected from the plurality of pressure rising curves, and the value of the selected rising curve at the intake valve close timing is adopted as an in-cylinder pressure estimated value at the intake valve close timing.

International publication No. WO2013/069157 (WO '157) discloses an apparatus for performing abnormality diagnosis and sensitivity correction of an in-cylinder pressure sensor. According to this apparatus, a peak value of the detected in-cylinder pressure at the compression top dead center is obtained in the state where the ignition timing of the engine is retarded from the compression top dead center, and the sensitivity of the in-cylinder pressure sensor is determined to be abnormal when a difference between the obtained peak value and a peak value of the previously stored motoring pressure (the motoring pressure corresponds to an in-cylinder pressure when no combustion is performed) becomes greater than a predetermined value. Further, if the sensitivity is determined to be abnormal, the detected in-cylinder pressure is corrected so that the difference decreases.

The method shown in WO '984 is a method for estimating a comparatively low in-cylinder pressure at the intake valve close timing with high accuracy, presuming that detection accuracy of the in-cylinder pressure sensor is comparatively high in the state where the detected in-cylinder pressure is comparatively high. That is, the method is not a method for suppressing detection error due to characteristic differences between pressure detecting elements or amplifiers.

In the method shown in WO '157, the sensitivity abnormality is determined using a peak value of the detected in-cylinder pressure, and the correction of the detected in-cylinder pressure is performed only when the sensitivity is determined to be abnormal. However, when the detected in-cylinder pressure indicative of the combustion state of the engine is used for the engine control such as the fuel injection control or the like, accuracy of the engine control becomes lower if the detected in-cylinder pressure contains an error caused by the characteristic differences between pressure detecting elements or amplifiers. Accordingly, it is desired to correct even a comparatively small error due to the characteristic differences to enhance the detection accuracy not only when the sensitivity is determined to be abnormal but also when the error is comparatively small.

SUMMARY OF THE INVENTION

The present invention was made contemplating the above-described points, and an objective of the present invention is to provide an in-cylinder pressure detecting apparatus for an internal combustion engine, which is able to suppress an error in the detected in-cylinder pressure with a comparatively simple method, thereby enhancing detection accuracy of the in-cylinder pressure.

To attain the above objective, the present invention provides an in-cylinder pressure detecting apparatus for an internal combustion engine (1), for detecting an in-cylinder pressure (PCYL) which is a pressure in a combustion chamber of the engine. The in-cylinder pressure detecting apparatus includes in-cylinder pressure detecting means, motoring pressure estimating means, detected pressure peak value obtaining means, estimated motoring pressure peak value calculating means, and sensitivity correcting means. The in-cylinder pressure detecting means detects the in-cylinder pressure (PCYL) and output the detected in-cylinder pressure. The motoring pressure estimating means estimates a motoring pressure corresponding to an in-cylinder pressure when no combustion is performed in the combustion chamber. The detected pressure peak value obtaining means obtains a peak value of the detected in-cylinder pressure (PCYL) as a detected pressure peak value (PCYLMAX) in a predetermined operating condition of the engine. The estimated motoring pressure peak value calculating means calculates an estimated motoring pressure peak value (PCMTMAX) which is a peak value of the motoring pressure estimated by the motoring pressure estimating means, the estimated motoring pressure peak value (PCMTMAX) corresponding to the detected pressure peak value (PCYLMAX). The sensitivity correcting means compares the detected pressure peak value (PCYLMAX) with the estimated motoring pressure peak value (PCMTMAX), and performs sensitivity correction of the in-cylinder pressure detecting means based on a result (RPMAX) of the comparison. The predetermined operating condition is an operating condition in which an exhaust gas temperature raising control is performed for raising a temperature of exhaust gases from the engine by increasing an intake air amount of the engine and retarding an ignition timing of the engine.

With this configuration, the motoring pressure corresponding to an in-cylinder pressure when no combustion is performed in the combustion chamber is estimated, a peak value of the detected in-cylinder pressure is obtained as the detected pressure peak value in the predetermined operating condition of the engine, and the estimated motoring pressure peak value corresponding to the detected pressure peak value is calculated. Further, the detected pressure peak value is compared with the estimated motoring pressure peak value and the sensitivity correction of the in-cylinder pressure detecting means is performed based on the comparison result. The influence of characteristic differences between the pressure detecting elements or the amplifiers is reflected most largely to the detected pressure peak value. Accordingly, accuracy of the sensitivity correction can be enhanced by using the detected pressure peak value. Further, the predetermined operating condition of the engine is the operating condition in which the exhaust gas temperature raising control is performed immediately after the cold start of the engine, for raising the temperature of exhaust gases from the engine by increasing the intake air amount of the engine and retarding the ignition timing of the engine. The exhaust gas temperature raising control is widely known for hastening activation of the exhaust gas purifying catalyst provided in the exhaust system of the engine. In the operating condition where the exhaust gas temperature raising control is performed, the intake air amount is greater than that in the fuel-cut operation, and the ignition timing is retarded. It is therefore confirmed that the actual in-cylinder pressure peak value in this operating condition substantially coincides with the estimated motoring pressure peak value. Accordingly, by comparing the detected pressure peak value with the estimated motoring pressure peak value in the predetermined operating condition, an error in the detected in-cylinder pressure can accurately be detected, which makes it possible to perform the sensitivity correction of the in-cylinder pressure detecting means with high accuracy by a comparatively simple method.

Further, the present invention provides another in-cylinder pressure detecting apparatus for an internal combustion engine (1), for detecting an in-cylinder pressure (PCYL) which is a pressure in a combustion chamber of the engine. The in-cylinder pressure detecting apparatus includes in-cylinder pressure detecting means, motoring pressure estimating means, detected pressure peak value obtaining means, estimated motoring pressure peak value calculating means, and sensitivity correcting means. The in-cylinder pressure detecting means detects the in-cylinder pressure (PCYL) and output the detected in-cylinder pressure. The motoring pressure estimating means estimates a motoring pressure corresponding to an in-cylinder pressure when no combustion is performed in the combustion chamber. The detected pressure peak value obtaining means obtains a peak value of the detected in-cylinder pressure (PCYL) as a detected pressure peak value (PCYLMAX) in a predetermined operating condition of the engine. The estimated motoring pressure peak value calculating means calculates an estimated motoring pressure peak value (PCMTMAX) which is a peak value of the motoring pressure estimated by the motoring pressure estimating means, the estimated motoring pressure peak value (PCMTMAX) corresponding to the detected pressure peak value (PCYLMAX). The sensitivity correcting means compares the detected pressure peak value (PCYLMAX) with the estimated motoring pressure peak value (PCMTMAX), and performs sensitivity correction of the in-cylinder pressure detecting means based on a result (RPMAX) of the comparison. The predetermined operating condition is an operating condition in which the engine is rotated at a predetermined high rotational speed without supplying fuel to the engine, and an intake air flow rate of the engine is made maximum upon inspection performed when a vehicle provided with the engine is shipped out from a manufacturing plant of the vehicle.

With this configuration, the motoring pressure corresponding to an in-cylinder pressure when no combustion is performed in the combustion chamber is estimated, a peak value of the detected in-cylinder pressure is obtained as the detected pressure peak value in the predetermined operating condition of the engine, and the estimated motoring pressure peak value corresponding to the detected pressure peak value is calculated. Further, the detected pressure peak value is compared with the estimated motoring pressure peak value and the sensitivity correction of the in-cylinder pressure detecting means is performed based on the comparison result. The influence of characteristic differences between the pressure detecting elements or the amplifiers is most largely reflected to the detected pressure peak value. Accordingly, accuracy of the sensitivity correction can be enhanced by using the detected pressure peak value. Further, the predetermined operating condition of the engine is the operating condition in which the engine is rotated at the predetermined high rotational speed without supplying fuel, and the intake air flow rate is made maximum upon the inspection performed when the vehicle provided with the engine is shipped out from the manufacturing plant. In the shipment inspection, the engine can be rotated at a stable rotational speed and the intake air flow rate can be made maximum by the plant equipment, which enables obtaining the detected in-cylinder pressure (detected motoring pressure) that is more stable than that in the above-described exhaust gas temperature raising control. Accordingly, by comparing the detected pressure peak value with the estimated motoring pressure peak value in the predetermined operating condition, an error in the detected in-cylinder pressure can accurately be detected, which makes it possible to perform the sensitivity correction of the in-cylinder pressure detecting means with high accuracy by a comparatively simple method.

Preferably, the in-cylinder pressure detecting apparatus further includes intake pressure obtaining means, first modifying means, and second modifying means. The intake pressure obtaining means detects or estimates an intake pressure (PBA) of the engine. The first modifying means modifies the detected in-cylinder pressure (PCYL, PCYLTMP) according to the intake pressure (PBAIN) obtained during the intake stroke of an object cylinder of which the in-cylinder pressure is detected. The second modifying means modifies the estimated motoring pressure (PCMT) used in the sensitivity correction, according to the intake pressure (PBABDC) obtained in the vicinity of a start timing of the compression stroke of the object cylinder. The detected pressure peak value obtaining means obtains a peak value of the modified detected in-cylinder pressure as the detected pressure peak value (PCYLMAX), and the estimated motoring pressure peak value calculating means calculates a peak value of the modified estimated motoring pressure as the estimated motoring pressure peak value (PCMTMAX).

With this configuration, the detected in-cylinder pressure is modified according to the intake pressure obtained during the intake stroke of the object cylinder, the estimated motoring pressure used in the sensitivity correction is modified according to the intake pressure obtained in the vicinity of the start timing of the compression stroke of the object cylinder, the peak value of the modified detected in-cylinder pressure is obtained as the detected pressure peak value, and the peak value of the modified estimated motoring pressure is calculated as the estimated motoring pressure peak value. The in-cylinder pressure in the intake stroke is substantially equal to the intake pressure (pressure in the intake passage). Accordingly, accuracy of the detected pressure peak value can be enhanced by calculating a modification amount by comparing the intake pressure obtained in the intake stroke with the detected in-cylinder pressure obtained at the same time, and by obtaining a peak value of the detected in-cylinder pressure modified using the calculated modification amount. Further, the estimated motoring pressure can be calculated using a model equation indicative of the relationship between the combustion chamber volume (engine rotational phase) and the in-cylinder pressure. By performing the modification taking the influence of the intake pressure into consideration, it is possible to enhance calculation accuracy of the estimated motoring pressure peak value.

Preferably, the in-cylinder pressure detecting means comprises a pressure detecting element (10), a charge amplifier

(21) for integrating and amplifying an output signal of the pressure detecting element, and a conversion block for converting an output voltage (VAOUT) of the charge amplifier to a pressure value (PCYLTMP). The conversion block has a plurality of conversion tables (TBLM5-TBLP5) for converting the output voltage of the charge amplifier to the detected in-cylinder pressure, and the sensitivity correcting means selects one of the plurality of conversion tables according to the result (RPMAX) of comparing the detected pressure peak value with the estimated motoring pressure peak value.

With this configuration, the output signal of the pressure detecting element is integrated and amplified by the charge amplifier, and the output voltage of the charge amplifier is converted to a pressure value in the conversion block. The conversion block has a plurality of conversion tables for converting the output voltage of the charge amplifier to the detected in-cylinder pressure, and the sensitivity correction is performed by selecting one of the plurality of conversion tables according to the result of comparing the detected pressure peak value with the estimated motoring pressure peak value. Accordingly, it is possible to easily correct sensitivity deviation due to characteristic differences between the pressure detecting elements or the charge amplifiers, to thereby obtain the detected in-cylinder pressure with high accuracy.

Preferably, the motoring pressure estimating means calculates the estimated motoring pressure using a model equation (3a) obtained by modeling a relationship between a rotational phase (CA) of the engine and the motoring pressure (PCMT), and the second modifying means modifies the model equation (3a) according to the intake pressure (PBABDC) obtained in the vicinity of the start timing of the compression stroke, and calculates the modified estimated motoring pressure (PCMT) using the modified model equation (3b).

With this configuration, the estimated motoring pressure is calculated using the model equation obtained by modeling a relationship between the rotational phase of the engine and the motoring pressure, the model equation is modified according to the intake pressure obtained in the vicinity of the start timing of the compression stroke, and the modified estimated motoring pressure is calculated using the modified model equation. The model equation modified taking the influence of the intake pressure into consideration can enhance calculation accuracy of the estimated motoring pressure peak value, to thereby enhance accuracy of the sensitivity correction.

Preferably, the engine has at least one fuel injection valve (6) and at least one ignition plug (7), and the first modifying means performs the modification using the intake pressure obtained at a timing (CAPB1) when there is no influence from noises due to fuel injection by the at least one fuel injection valve (6) or noises due to ignition by the at least one ignition plug (7).

With this configuration, the detected in-cylinder pressure is modified using the intake pressure obtained at a timing when there is no influence from noises due to fuel injection by the fuel injection valve(s) or from noises due to ignition by the ignition plug(s). Electro-magnetic noises are generated by the fuel injection by the fuel injection valve, or by the ignition by the ignition plug, which may possibly reduce accuracy of the detected in-cylinder pressure. Accordingly, by performing the modification using the intake pressure obtained at the timing when there is no influence from such noises, it is possible to prevent reduction in accuracy of the detected in-cylinder pressure after the modification.

Preferably, the in-cylinder pressure detecting apparatus further includes abnormality processing means for determining that the sensitivity of the in-cylinder pressure detecting means is abnormal if the result of comparing the detected pressure peak value with the estimated motoring pressure peak value indicates that the correction using the plurality of conversion tables is impossible, and selecting a conversion table having an average conversion characteristic of the plurality of conversion tables.

With this configuration, if the result of comparing the detected pressure peak value with the estimated motoring pressure peak value indicates that the correction using the plurality of conversion tables is impossible, the sensitivity of the in-cylinder pressure detecting means is determined to be abnormal, and the conversion table having an average conversion characteristic of the plurality of conversion tables is selected. Accordingly, abnormality of the in-cylinder pressure detecting means can accurately be determined with a comparatively simple method, which makes it possible to promptly cope with the abnormality, for example, by performing an alarm display.

DETAILED DESCRIPTION OF THE PREFERRED EMBODIMENTS

Preferred embodiments of the present invention will now be described with reference to the drawings.

Figure 1:
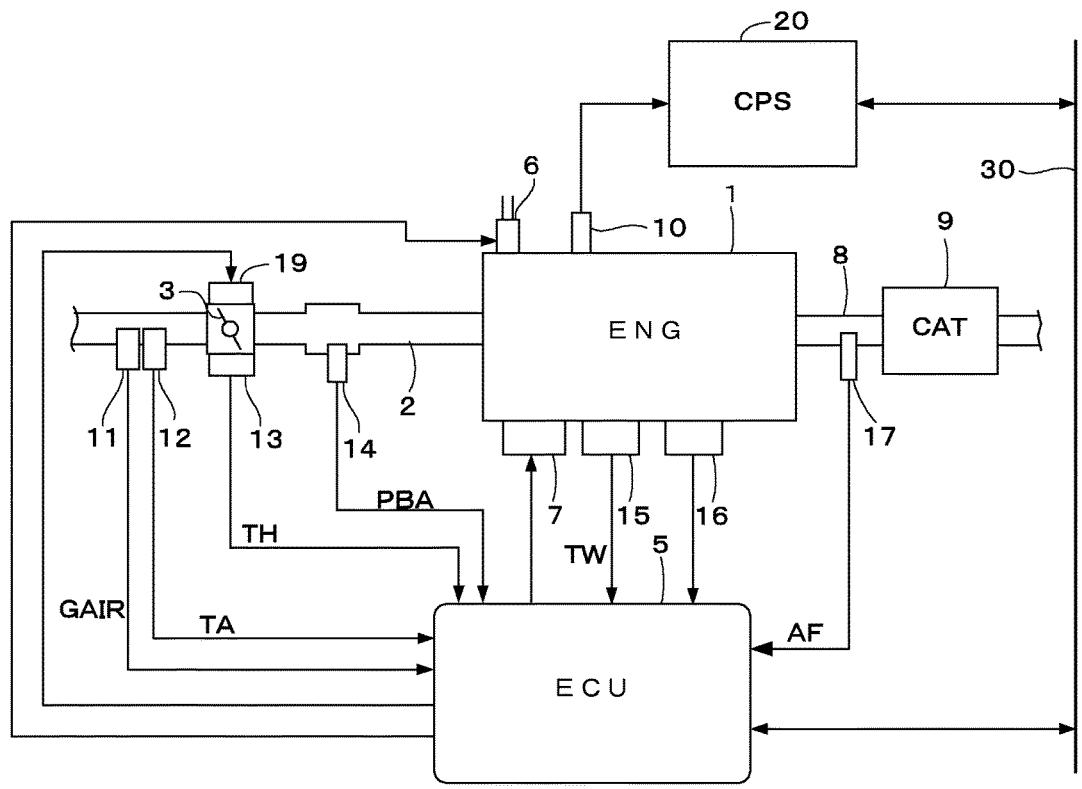
FIG. 1 shows a configuration of an internal combustion engine and a control apparatus therefor according to one embodiment of the present invention.

FIG. 1 shows a configuration of an internal combustion engine (hereinafter referred to as "engine") and a control apparatus therefor according to one embodiment of the present invention. The engine 1 has, for example, four cylinders, and an intake passage 2 of the engine 1 is provided with a throttle valve 3. The throttle valve 3 is configured so as to be actuated by an actuator 19, and the actuator 19 is connected to an electronic control unit (hereinafter referred to as "ECU") 5. An opening of the throttle valve 3 is controlled with the actuator 19 by the ECU 5.

Each cylinder of the engine 1 is provided with a fuel injection valve 6 for injecting fuel into a combustion chamber and a spark plug 7, and the fuel injection valve 6 and the spark plug 7 are connected to the ECU 5. The ECU 5 performs a fuel injection control by the fuel injection valve 6, and an ignition timing control by the spark plug 7. Each cylinder of the engine 1 is further provided with an in-cylinder pressure sensor (a pressure detecting element) 10 detecting an in-cylinder pressure which is a pressure in the combustion chamber, and the in-cylinder pressure sensor 10 is connected to an in-cylinder pressure sensing unit (henceforth a "CPS unit") 20. In this embodiment, the in-cylinder pressure sensor 10 is integrated with the fuel injection valve 6 and mounted on each cylinder.

An intake air flow rate sensor 11 for detecting an intake air flow rate GAIR of the engine 1, an intake air temperature sensor 12 for detecting an intake air temperature TA, a throttle valve opening sensor 13 for detecting a throttle valve opening TH, an intake pressure sensor 14 for detecting an intake pressure PBA, a cooling water temperature sensor 15 for detecting an engine cooling water temperature TW, and other sensors not shown (for example, an accelerator sensor for detecting an accelerator pedal operation amount AP of the vehicle driven by the engine 1, a vehicle speed sensor, etc.) are connected to the ECU 5, and the detection signals from these sensors are supplied to the ECU 5.

A crank angle position sensor 16 for detecting a rotation angle of a crankshaft (not shown) of the engine 1 is connected to the ECU 5, and pulse signals according to the rotation angle of the crankshaft is supplied to the ECU 5. The crank angle position sensor 16 outputs a plurality of pulse signals (a pulse signal of 1-degree crank angle period, a pulse signal of 180-degree crank angle period, and a pulse signal of 720-degree crank angle period) indicating crank angle positions. These pulse signals are used for various timing controls, such as a fuel injection timing control, and an ignition timing control, and for detecting an engine rotational speed NE.

An exhaust passage 8 of the engine 1 is provided with a three-way catalyst 9 for purifying exhaust gases. A proportional-type oxygen concentration sensor 17 (hereinafter referred to as "LAF sensor 17") is mounted on the upstream side of the three-way catalyst 9. The LAF sensor 17 outputs a detection signal substantially proportional to an oxygen concentration in the exhaust gases (air-fuel ratio AF), and the detection signal is supplied to the ECU 5.

The ECU 5 includes an input circuit, a central processing unit (CPU), a memory circuit, and an output circuit. The input circuit performs various functions, including shaping the waveforms of input signals from various sensors, correcting the voltage levels of the input signals to a predetermined level, and converting analog signal values into digital values. The memory circuit preliminarily stores various operating programs to be executed by the CPU and stores the results of computations, or the like, by the CPU. The output circuit supplies drive signals to the fuel injection valves 6, the ignition plugs 7, the actuator 19, and the like.

The fuel injection amount by the fuel injection valve 6 is controlled by correcting a basic fuel amount calculated according to the intake air flow rate GAIR with an air-fuel ratio correction coefficient KAF calculated according to the air-fuel ratio AF detected by the LAF sensor 17. The air-fuel ratio correction coefficient KAF is calculated so that the detected air-fuel ratio AF coincides with a target air-fuel ratio AFCMD.

The ECU 5 calculates a target opening THCMD of the throttle valve 3 according to the accelerator pedal operation amount AP and other parameters, and performs actuation control of the actuator 19 so that the detected throttle valve opening TH coincides with the target opening THCMD.

Figure 2:
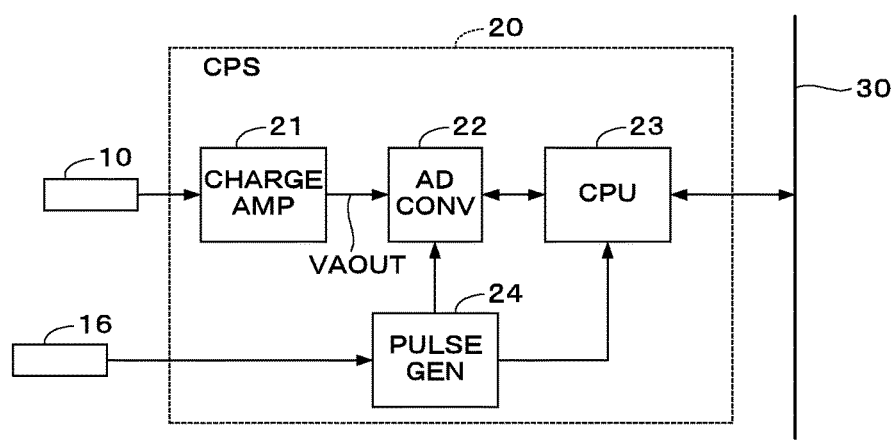
FIG. 2 is a block diagram showing a configuration of an in-cylinder pressure sensing unit (20) shown in FIG. 1.

The CPS unit 20 has, as shown in FIG. 2, a charge amplifier 21, an AD converter 22, CPU 23, a pulse generation block 24, a memory circuit and the like which are not illustrated. The output signal of the in-cylinder pressure sensor 10 is input to the charge amplifier 21, which integrates and amplifies the input signal. The output signal VAOUT of the charge amplifier 21 is converted to a digital value by the AD converter 22, and the digital value is input to the CPU 23. The output signal VAOUT indicates a voltage value proportional to the in-cylinder pressure, and is hereinafter referred to as "detected voltage VAOUT". The CPU 23 converts the detected voltage VAOUT into a temporary in-cylinder pressure PCYLTMP, and calculates an in-cylinder pressure PCYL by modifying the temporary in-cylinder pressure PCYLTMP as described later.

The pulse signals from the crank angle position sensor 16 are input to the pulse generation block 24. The pulse generation block 24 supplies required pulse signals to the AD converter 22 and the CPU 23.

The ECU 5 and the CPS unit 20 are connected with each other through a data bus 30, and the ECU 5 and the CPS unit 20 transmit and receive required data via the data bus 30.

In this embodiment, an exhaust gas temperature raising control is performed for hastening activation (temperature rise) of the three-way catalyst 9 immediately after the cold start of the engine 1. This control is shown, for example, in Japanese Patent Laid-open publication No. 2002-188500, and is already known as the catalyst temperature rise promotion control. Specifically, the exhaust gas temperature raising control is performed by setting the opening TH of the throttle valve 3 to a comparatively large opening (near the fully-opened state) in the idling operating condition of the engine 1 to increase the intake air amount of the engine 1, and retarding the ignition timing from the compression top dead center (for example, the retard amount is set to about 20 degrees).

The ECU 5 performs a determination of the knocking and a determination of a combustion state based on the in-cylinder pressure PCYL detected by the in-cylinder pressure sensor 10, and further performs the ignition timing control and the fuel injection control according to the determination results. The CPS unit 20 performs a sensitivity correction by which an error in the temporary in-cylinder pressure PCYLTMP due to characteristic differences between the in-cylinder pressure sensors 10 and/or the charge amplifiers 21 is corrected.

Figure 3:
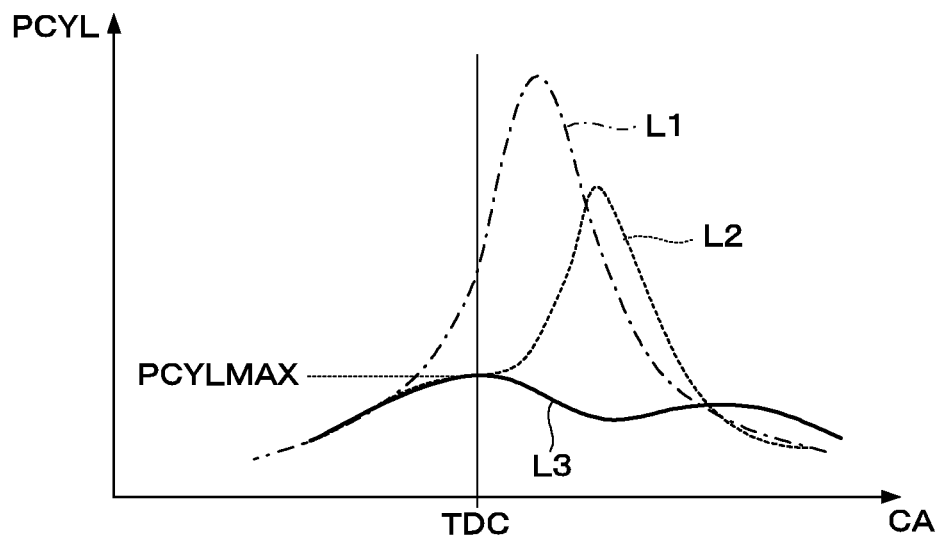
FIG. 3 shows a waveform of changes in the in-cylinder pressure.

FIG. 3 shows a waveform of changes in the in-cylinder pressure PCYL (the horizontal axis indicates the crank angle CA and TDC corresponds to the compression stroke end timing (the compression top dead center)). In FIG. 3, the dashed line L1 corresponds to the normal operation, the broken line L2 corresponds to a state where the ignition timing is retarded in the normal operation, and the solid line L3 corresponds to a state where the above-described exhaust gas temperature raising control is performed.

When performing the exhaust gas temperature raising control, combustion of the air-fuel mixture is performed in the combustion chamber, but the increase in the in-cylinder pressure caused by the combustion is very small as shown by the solid line L3. Accordingly, the in-cylinder pressure PCYL takes a peak value (hereinafter referred to as "detected pressure peak value") PCYLMAX at the compression top dead center. The detected pressure peak value PCYLMAX substantially coincides with a peak value of the motoring pressure which is an in-cylinder pressure when no combustion is performed in the combustion chamber, if the detected pressure peak value PCYLMAX contains no error.

Accordingly, if the temporary in-cylinder pressure PCYLTMP contains the error due to characteristic differences, the detected pressure peak value PCYLMAX deviates from the motoring pressure peak value. In this embodiment, the sensitivity correction is therefore performed for correcting a converting characteristic applied to converting the detected voltage VAOUT output from the charge amplifier 21 to the temporary in-cylinder pressure PCYLTMP, the sensitivity correction being performed based on a ratio RPMAX (=PCYLMAX/PCMTMAX) of the detected pressure peak value PCYLMAX and an estimated motoring pressure peak value PCMTMAX. The estimated motoring pressure peak value PCMTMAX is a peak value of an estimated motoring pressure PCMT which is calculated using a model equation described later.

In the exhaust gas temperature raising control, the throttle valve opening TH is set to a comparatively large opening near the full opening as described above. Accordingly, the intake air amount becomes large (the in-cylinder pressure becomes high), which can enhance detection accuracy of the detected pressure peak value PCYLMAX compared with the case where the peak value of the detected pressure is obtained, for example, during the fuel cut operation. The exhaust gas temperature raising control is performed during a period from the time of immediately after the cold start of the engine to the time the temperature of the three-way catalyst 9 reaches a predetermined temperature, or to the time a predetermined time period passes from the time of the cold start.

Figure 4:
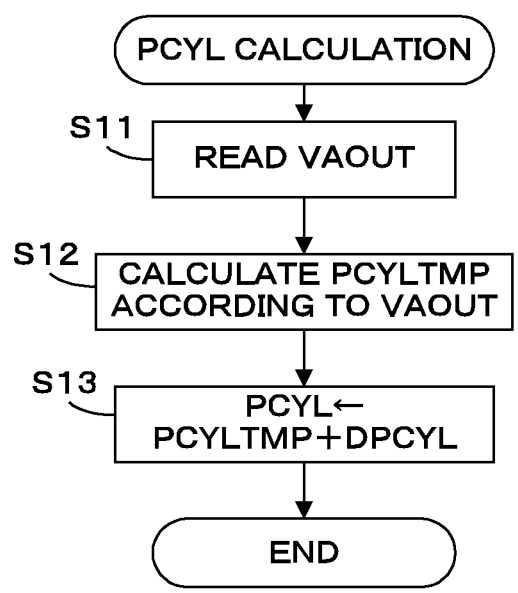
FIG. 4 is a flowchart for illustrating a process for calculating the in-cylinder pressure.

FIG. 4 is a flowchart for explaining the process in which the in-cylinder pressure PCYL is calculated, and this process is executed by the CPU 23 in the CPS unit 20.

Figure 5:
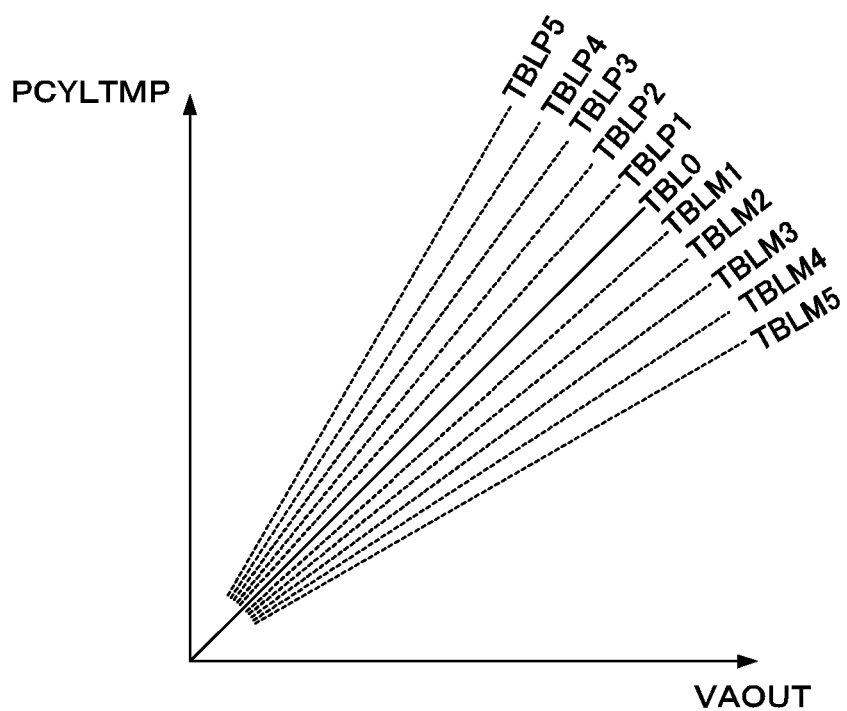
FIG. 5 shows VP conversion tables which are referred to in the process of FIG. 4.

In step S11, the detected voltage VAOUT is read. In step S12, one of the VP conversion tables shown in FIG. 5 is retrieved according to the detected voltage VAOUT, to calculate the temporary in-cylinder pressure PCYLTMP. In this embodiment, eleven VP conversion tables TBLM5, TBLM4,-,TBL0,TBLP1,-,TPBP5 are stored in a memory (not shown), and one VP conversion table TBLUSE in use (hereinafter referred to as "in-use conversion table TBLUSE") is determined in the sensitivity correction process described later. As shown in FIG. 5, the conversion table TBLM5 has a conversion characteristic of the smallest inclination, and the conversion table TBLP5 has a conversion characteristic of the largest inclination. In the initial state, the reference conversion table TBL0 is set as the in-use conversion table TBLUSE.

In step S13, the temporary in-cylinder pressure PCYLTMP is applied to the following equation (1), to calculate the in-cylinder pressure PCYL. DPCYL in the equation (1) is a detected pressure modifying value, and the calculation method thereof is described later.

$$PCYL=PCYLTMP+DPCYL \quad (1)$$

Figure 6:
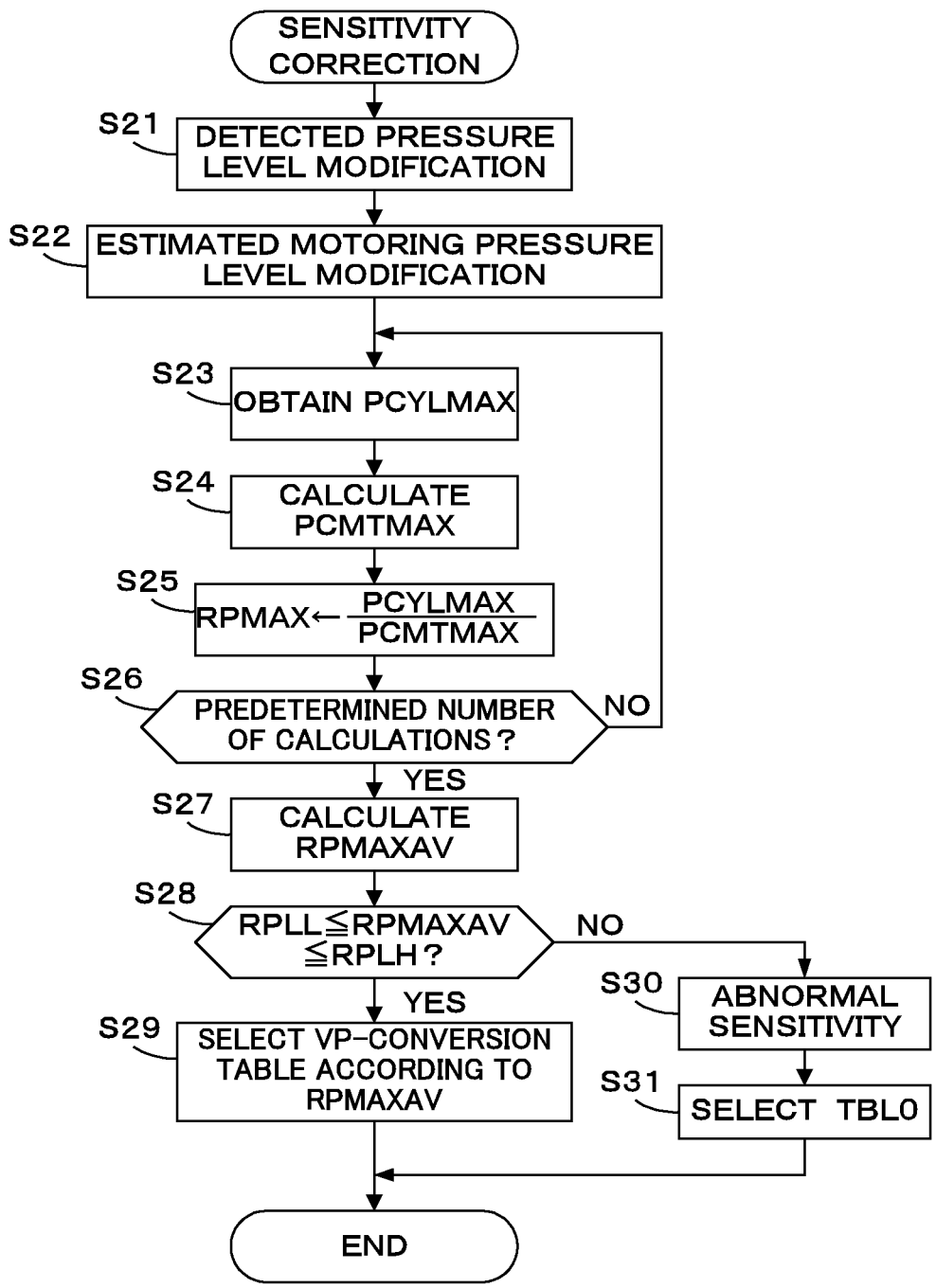
FIG. 6 is a flowchart for explaining a method of the sensitivity correction process.

FIG. 6 is a flowchart for explaining the method of the sensitivity correction process, which is performed in the ECU 5 and the CPS unit 20. In step S21, a detected pressure level modification is performed.

The detected voltage VAOUT output from the charge amplifier 21 is obtained by integrating and amplifying the sensor output indicative of a rate of change (dPCYL/dt) in the in-cylinder pressure. Accordingly, the temporary in-cylinder pressure PCYLTMP calculated by converting the detected voltage VAOUT to a pressure value may not necessarily indicate an accurate value of the in-cylinder pressure. The detected pressure level modification is therefore performed using the intake pressure PBA detected by the intake pressure sensor 14 for detecting an absolute pressure in the intake passage 2.

Figure 7:
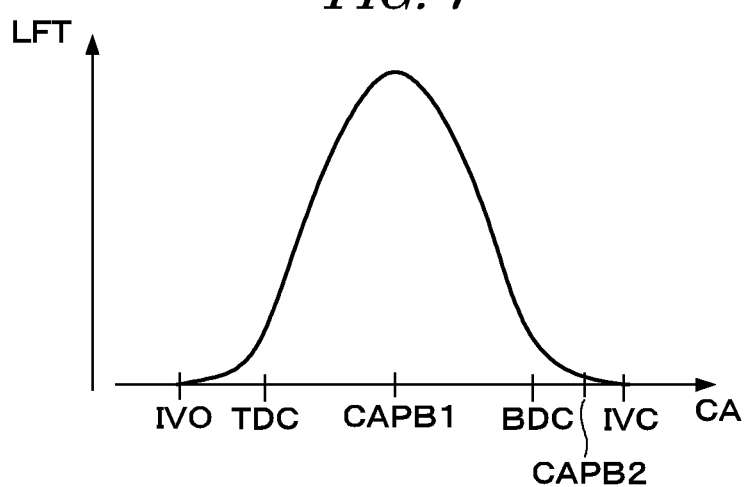
FIG. 7 shows a lift curve of an intake valve.

In the detected pressure level modification, an intake stroke intake pressure PBAIN is used. The intake stroke intake pressure PBAIN is detected during the intake stroke of the object cylinder of which the in-cylinder pressure is detected. Specifically, the intake stroke intake pressure PBAIN is detected at a timing CAPB1 when the rotation angle of the crankshaft reaches about 90 degrees from the top dead center corresponding to the start of the intake stroke. FIG. 7 shows a lift curve of the intake valve (vertical axis: lift amount LFT, horizontal axis: crank angle CA), and the detection timing of the intake stroke intake pressure PBAIN is indicated by CAPB1.

At the detection timing CAPB1 which is in the vicinity of the center of the intake stroke, the flowing speed of the intake air becomes maximum, and the pressure detected by the in-cylinder pressure sensor 10 indicates an average intake pressure during the intake stroke, which makes it possible to enhance accuracy of the detected pressure level modification. The intake stroke intake pressure PBAIN is therefore detected at the detection timing CAPB1. In addition, the detection timing CAPB1 is set to the timing when there is no influence from noises caused by performing the fuel injection by the fuel injection valve 6 or from noises caused by performing the ignition by the ignition plug 7 in the object cylinder or in another cylinder. By setting the detection timing CAPB1 as described above, accuracy of the detected pressure level modification can be enhanced.

The temporary in-cylinder pressure PCYLTMP and the intake stroke intake pressure PBAIN are applied to the following equation (2), to calculate the detected pressure modifying value DPCYL. Further, the detected pressure modifying value DPCYL is applied to the above-described equation (1) to calculate the detected in-cylinder pressure PCYL.

$$DPCYL=PBAIN-PCYLTMP \quad (2)$$

In step S22 of FIG. 6, an estimated motoring pressure level modification is performed. The calculation method of an estimated motoring pressure PCMT which is an estimated value of the motoring pressure is first explained and the level modification of the estimated motoring pressure PCMT will be next explained.

In this embodiment, the estimated motoring pressure PCMT is calculated by the following model equation (3). It is to be noted that details of the calculation method of the estimated motoring pressure PCMT using the equation (3) are disclosed in U.S. Pat. No. 4,241,581 of the patent owned by the present applicant.

$$PCMT=(G \times R \times T/VC) \times k+C \quad (3)$$

In the equation (3), G is an intake air amount calculated based on the intake air flow rate GAIR detected by the intake air flow rate sensor 11 or the intake air flow rate calculated according to the engine rotational speed NE and the intake pressure PBA; R is the gas constant; T is the detected intake air temperature TA (absolute temperature) or an intake air temperature estimated according to the engine cooling water temperature TW, etc.; VC is a volume of the combustion chamber; k and C are parameters for correcting deviation from the ideal state, and hereinafter referred to as "model parameter". The combustion chamber volume VC is calculated according to the detected crank angle.

The model parameters k and C are identified so that the difference (error) between the detected in-cylinder pressure PCYL and the estimated motoring pressure PCMT calculated by the model equation (3) becomes minimum using the least squares method. The identifying calculation is executed in the compression stroke of the object cylinder. However, the identifying calculation is stopped when performing the sensitivity correction process. The estimated motoring pressure PCMT calculated by the equation (3) is applied, for example, to the misfire determination of the engine 1.

The estimated motoring pressure level modification is next explained. In the estimated motoring pressure level modification, a bottom dead center intake pressure PBABDC is used. The bottom dead center intake pressure PBABDC is detected in the vicinity of the bottom dead center corresponding to the end of the intake stroke of the object cylinder. Specifically, as shown in FIG. 7, the bottom dead center intake pressure PBABDC is detected at a detection timing CAPB2 in the period from the bottom dead center corresponding to the end of the intake stroke to the close timing IVC of the intake valve. The motoring pressure which can be estimated by the model equation (3) is a pressure in the compression stroke and the expansion stroke. Accordingly, not the intake pressure PBA during the intake stroke, but the bottom dead center intake pressure PBABDC, which is detected at the intake stroke end bottom dead center or immediately thereafter (before the intake valve is closed), is applied to the estimated motoring pressure level modification.

The estimated motoring pressure level modification is specifically performed as follows. The bottom dead center intake pressure PBABDC and a bottom dead center estimated motoring pressure PCMTBDC are applied to the following equation (4), to calculate the motoring pressure modifying value DPCMT.

$$DPCMT=PBABDC-PCMTBDC \qquad (4)$$

The following model equation (3a) is used for calculating the bottom dead center estimated motoring pressure PCMTBDC in the sensitivity correction process, instead of the model equation (3). The equation (3a) corresponds to the equation in which the model parameters k and C of the equation (3) are set respectively to "1" and "0". That is, the bottom dead center estimated motoring pressure PCMTBDC is calculated by the equation (3a) by applying the intake air amount G, the intake air temperature T, and the combustion chamber volume VC at the detection timing CAPB2 to the equation (3a).

$$PCMT=(G \times R \times T/VC) \qquad (3a)$$

In the sensitivity correction process, the following equation (3b) including the motoring pressure modifying value DPCMT calculated by the equation (4) is used as a modified model equation.

$$PCMT=(G \times R \times T/VC)+DPCMT \qquad (3b)$$

In step S23, the in-cylinder pressure PCYL detected at the compression top dead center when performing the exhaust temperature raising control described above, is obtained as a detected pressure peak value PCYLMAX. At this time, the in-use conversion table TBLUSE is set to the reference table TBL0.

In step S24, the intake air amount G and the intake air temperature T at the timing of obtaining the detected pressure peak value PCYLMAX, and the combustion chamber volume VC at the compression top dead center are applied to the equation (3b), to calculate the estimated motoring pressure peak value PCMTMAX.

In step S25, a peak pressure ratio RPMAX is calculated by the following equation (5), and stored in the memory.

$$RPMAX=PCYLMAX/PCMTMAX \qquad (5)$$

In step S26, it is determined whether or not the calculation of the peak pressure ratio RPMAX has been performed a predetermined number N of times (for example, 10 times). If the answer to step S25 is negative (NO), the process returns to step S23 to repeatedly calculate the peak pressure ratio RPMAX.

If the answer to step S26 is affirmative (YES), the process proceeds to step S27 to calculate an average value RPMAXAV of the peak pressure ratios RPMAXi (i=1−N). In step S28, it is determined whether or not the average value RPMAXAV is equal to or greater than a predetermined lower limit value RPLL, and is equal to or less than a predetermined upper limit value RPLH. If the answer to step S28 is affirmative (YES), the process proceeds to step S29, in which one VP conversion table is selected from the VP conversion tables TBLM5-TBLP5 according to the average value RPMAXAV, and the selected table is set as the in-use conversion table TBLUSE. That is, if the average value RPMAXAV is equal to a value in the vicinity of "1.0", the reference table TBL0 is selected as the in-use conversion table TBLUSE. A table with smaller inclination (TBLM1-TBLM5) is selected as the average value RPMAXAV increases from "1.0", and a table with larger inclination (TBLP1-TBLP5) is selected as the average value RPMAXAV decreases from "1.0".

If the answer to step S28 is negative (NO), i.e., when the average value RPMAXAV is less than the predetermined lower limit value RPLL or greater than the predetermined upper limit value RPLH, in other words, when the average value RPMAXAV indicates that it is impossible to perform the sensitivity correction using one of the conversion tables shown in FIG. 5, it is determined that there exists abnormality in the in-cylinder pressure sensor 10 or the charge amplifier 21, and the detection sensitivity takes an abnormal value. Then an abnormality alarm display is, for example, performed (step S30), and the in-use conversion table TBLUSE is set to the reference table TBL0 of the average conversion characteristic as fail-safe action (step S31).

Preferably, the sensitivity correction process should always be performed upon initial mounting of the in-cylinder pressure sensor 10 and the CPS unit 20, or immediately after the exchange due to failure of the in-cylinder pressure sensor 10 or the CPS unit 20. Further, it is also desirable to perform the sensitivity correction process when the maximum difference between the peak values of the in-cylinder pressures of the four cylinders detected during one combustion cycle exceeds a predetermined threshold value. Alternatively, the sensitivity correction process may always be performed immediately after the cold start of the engine 1.

As described above, in this embodiment, the estimated motoring pressure PCMT is calculated as an estimated value of the motoring pressure which is an in-cylinder pressure where no combustion is performed in the combustion chamber of the engine 1, a peak value of the detected in-cylinder pressure PCYL is obtained as the detected pressure peak value PCYLMAX in the operating condition where the exhaust gas temperature raising control is performed immediately after the cold start of the engine 1, and the estimated motoring pressure peak value PCMTMAX corresponding to the detected pressure peak value PCYLMAX is calculated. Further, the sensitivity correction for correcting the sensitivity differences due to characteristic differences between the in-cylinder pressure sensors (pressure detecting element) 10 or the charge amplifiers 21, is performed by selecting one VP conversion table based on the peak pressure ratio RPMAX which is a ratio of the detected pressure peak value PCYLMAX and the estimated motoring pressure peak value PCMTMAX. Since influence of the characteristic differences between the in-cylinder pressure sensors (pressure detecting elements) 10 or the charge amplifiers 21 is most greatly reflected to the detected pressure peak value PCYLMAX, it is possible to enhance accuracy of the sensitivity correction by using the peak pressure ratio RPMAX indicative of the ratio of the detected pressure peak value PCYLMAX and the estimated motoring pressure peak value PCMTMAX.

Further, the sensitivity correction is performed in the operating condition where the exhaust gas temperature raising control is performed for raising the exhaust gas temperature of the engine 1 by increasing the intake air amount and retarding the ignition timing immediately after the cold start of the engine 1. The exhaust gas temperature raising control is widely known for hastening activation of the exhaust gas purifying catalyst 9 provided in the exhaust passage 8 of the engine 1. In the operating condition where the exhaust gas temperature raising control is performed, the intake air amount is greater than that in the fuel-cut operation, and the ignition timing is retarded. It is therefore confirmed that the actual in-cylinder pressure peak value in this operating condition substantially coincides with the estimated motoring pressure peak value PCMTMAX. Accordingly, an error contained in the detected in-cylinder pressure PCYL can accurately be detected with the peak pressure ratio RPMAX obtained when performing the exhaust gas temperature raising control, which makes it possible to perform the sensitivity correction of the in-cylinder pressure detecting block, which is a combination of the in-cylinder pressure sensor 10 and the charge amplifier 21, with high accuracy by a comparatively simple method.

Further, the detected pressure modifying value DPCYL is calculated according to the intake stroke intake pressure PBAIN detected during the intake stroke of the object cylinder, the detected pressure peak value PCYLMAX is calculated using the equation (1) to which the detected pressure modifying value DPCYL is applied, the motoring pressure modifying value DPCMT is calcualted according to the bottom dead center intake pressure PBABDC obtained in the vicinity of the start timing of the compression stroke of the object cylinder, and the estimated motoring pressure peak value PCMTMAX is calculated using the equation (3b) to which the motoring pressure modifying value DPCMT is applied. Since the in-cylinder pressure in the intake stroke is substantially equal to the intake pressure PBA, the detected pressure modifying value DPCYL can be calculated by comparing the intake stroke intake pressure PBAIN with the temporaty in-cylinder pressure PCYLTMP (eq. (2)). Further, by modifying the temporary in-cylinder pressure PCYLTMP using the detected pressure modifying value DPCYL (eq. (1)), the detected in-cylinder pressure of higher accuracy can be obtained, which makes it possible to enhance accuracy of the detected pressure peak value PCYLMAX. Further, the estimated motoring pressure PCMT is calculated using the modified model equation (3b) to which the motoring pressure modifying value DPCMT is applied, the modified model equation (3b) indicating a relationship between the combustion chamber volume VC and the motoring pressure. Accordingly, the estimated motoring pressure peak value PCMTMAX is calculated taking influence of the intake pressure PBA into consideration, which makes it possible to enhance calculation accuracy of the estimated motoring pressure peak value PCMTMAX.

Further, the output signal of the in-cylinder pressure sensor 10 is integrated and amplified by the charge amplifier 21, and the detected voltage VAOUT output from the charge amplifier 21 is converted to the temporary in-cylinder pressure PCYLTMP by the CPU 23. The CPU 23 is provided with the plurality of conversion tables TBLM5-TBLP5 for converting the detected voltage VAOUT to the temporary in-cylinder pressure PCYLTMP as shown in FIG. 5, and one of the plurality of conversion tables TBLM1-TBLP5 is selected as the in-use conversion table TBLUSE, according to the peak pressure ratio RPMAX which is a ratio of the detected pressure peak value PCYLMAX and the estimated motoring pressure peak value PCMTMAX, to perform the sensitivity correction. Accordingly, deviation in the sensitivity caused by the characteristic differences between the in-cylinder pressure sensors 10 (pressure detecting element) or the charge amplifiers 21 can be corrected with a comparatively simple method, to obtain an accurate value of the detected in-cylinder pressure PCYL.

Further, the estimated motoring pressure PCMT is calculated using the model equation (3a) which is obtained by modeling the relationship between the rotational phase of the engine 1 and the motoring pressure, the model equation (3a) is modified according to the bottom dead center intake pressure PBABDC obtained in the vicinity of the compression stroke start timing, and the estimated motoring pressure peak value PCMTMAX is calculated using the modified model equation (3b). By using the model equation (3b) which is modified taking influence of the intake pressure PBA into consideration, calculation accuracy of the estimated motoring pressure peak value PCMTMAX can be raised to thereby enhance accuracy of the sensitivity correction.

Further, the detected pressure modifying value DPCYL is calculated using the intake stroke intake pressure PBAIN obtained at the timing when there is no influence from noises due to the fuel injection by the fuel injection valve 6 or from noises due to the ignition by the ignition plug 7. Accordingly, it is possible to prevent the detected pressure modifying value DPCYL from taking an inappropriate value due to the influence of noises, thereby preventing reduction in accuracy of the detected in-cylinder pressure PCYL calculated using DPCYL.

Further, when the average value RPMAXAV of the peak pressure ratio RPMAX has deviated from the correctable range between the predetermined lower limit value RPLL and the predetermined upper limit value RPLH, i.e., the range in which the sensitivity can be corrected by using the conversion tables TBLM5-TBLP5, it is determined that the sensitivity of the in-cylinder pressure detection block, which is a combination of the in-cylinder pressure sensor 10 and the charge amplifier 21, is abnormal, and the in-use conversion table TBLUSE is set to the reference table TBL0 corresponding to the average conversion characteristic. Accordingly, an abnormality of the in-cylinder pressure detection block can be determined with sufficient accuracy by a comparatively simple method, which makes it possible to promptly cope with the abnormality.

In this embodiment, the in-cylinder pressure sensor 10 corresponds to the pressure detecting element, the CPU 23 constitutes the conversion block, and the in-cylinder pressure sensor 10, the charge amplifier 21, the AD converter 22, and the CPU 23 constitute the in-cylinder pressure detecting means. The intake pressure sensor 14 corresponds to the intake pressure obtaining means, the ECU 5 constitutes the motoring pressure estimating means, the estimated motoring pressure peak value calculating means, and the second modifying means, and the CPU 23 constitutes the detected pressure peak value obtaining means, the sensitivity correcting means, the first modifying means, and the abnormality processing means.

The present invention is not limited to the embodiment described above, and various modifications may be made. For example, in the above-described embodiment, the in-use conversion table TBLUSE is determined according to the peak pressure ratio RPMAX. Alternatively, the in-use conversion table TBLUSE may be determined according to the reciprocal (=PCMTMAX/PCYLMAX) of the peak pressure ratio RPMAX, or a difference (PCYLMAX−PCMTMAX) or (PCMTMAX−PCYLMAX) between the detected pressure peak value PCYLMAX and the estimated motoring pressure peak value PCMTMAX.

Further, in the above-described embodiment, the intake stroke intake pressure PBAIN and the bottom dead center intake pressure PBABDC which are applied to the detected pressure level modification and the motoring pressure level modification (FIG. 6, steps S21 and S22), is detected by the intake pressure sensor 14. Alternatively, the intake stroke intake pressure PBAIN and the bottom dead center intake pressure PBABDC may be estimated, for example, according to the intake air flow rate GAIR and the engine rotational speed NE.

Further, in the shipment inspection of the vehicle provided with the engine 1, the setting of the in-use conversion table TBLUSE based on the peak pressure ratio RPMAX is preferably performed in the condition where a stable in-cylinder pressure is generated by rotating the engine 1 at a predetermined high rotational speed such as about 4000 rpm by the plant equipment, and performing the fuel cut operation in which the throttle valve is fully opened.

In the shipment inspection, the engine 1 can be rotated at a stable rotational speed and the intake air flow rate can be made maximum (the throttle valve can be fully opened) by the plant equipment, which enables obtaining the detected in-cylinder pressure (detected motoring pressure) that is more stable than that in the above-described exhaust gas temperature raising control. Accordingly, by using the peak pressure ratio RPMAX obtained in this engine operating condition, the deviation in the detected in-cylinder pressure can accurately be detected, which makes it possible to perform the sensitivity correction of the in-cylinder pressure detecting block with high accuracy by a comparatively simple method.

Further, in the above-described embodiment, an example in which the in-cylinder pressure sensor (pressure detecting element) is integrated with the fuel injection valve for injecting fuel into the combustion chamber, is shown. Alternatively, the pressure detecting element may be integrated with the ignition plug, or the pressure detecting element may solely be mounted on the combustion chamber. Further, the present invention can be applied also to the in-cylinder pressure detecting apparatus for an internal combustion engine provided with a fuel injection valve for injecting fuel into the intake passage. In addition, the present invention can be applied also to an in-cylinder pressure detecting apparatus for a watercraft propulsion engine such as an outboard engine having a vertically extending crankshaft.

What is claimed is:

1. An in-cylinder pressure detecting apparatus for an internal combustion engine, for detecting an in-cylinder pressure which is a pressure in a combustion chamber of said engine, said in-cylinder pressure detecting apparatus comprising:
   in-cylinder pressure detecting means for detecting the in-cylinder pressure and output the detected in-cylinder pressure;
   motoring pressure estimating means for estimating a motoring pressure corresponding to an in-cylinder pressure when no combustion is performed in said combustion chamber;
   detected pressure peak value obtaining means for obtaining a peak value of the detected in-cylinder pressure as a detected pressure peak value in a predetermined operating condition of said engine;
   estimated motoring pressure peak value calculating means for calculating an estimated motoring pressure peak value which is a peak value of the motoring pressure estimated by said motoring pressure estimating means, the estimated motoring pressure peak value corresponding to the detected pressure peak value; and
   sensitivity correcting means for comparing the detected pressure peak value with the estimated motoring pressure peak value, and performing sensitivity correction of said in-cylinder pressure detecting means based on a result of the comparison,
   wherein the predetermined operating condition is an operating condition in which an exhaust gas temperature raising control is performed for raising a temperature of exhaust gases from said engine by increasing an intake air amount of said engine and retarding an ignition timing of said engine.

2. The in-cylinder pressure detecting apparatus according to claim 1, further comprising:
   intake pressure obtaining means for detecting or estimating an intake pressure of said engine;
   first modifying means for modifying the detected in-cylinder pressure according to the intake pressure obtained during the intake stroke of an object cylinder of which the in-cylinder pressure is detected; and
   second modifying means for modifying the estimated motoring pressure used in the sensitivity correction, according to the intake pressure obtained in the vicinity of a start timing of the compression stroke of said object cylinder,
   wherein said detected pressure peak value obtaining means obtains a peak value of the modified detected in-cylinder pressure as the detected pressure peak value, and
   said estimated motoring pressure peak value calculating means calculates a peak value of the modified estimated motoring pressure as the estimated motoring pressure peak value.

3. The in-cylinder pressure detecting apparatus according to claim 2, wherein said motoring pressure estimating means calculates the estimated motoring pressure using a model equation obtained by modeling a relationship between a rotational phase of said engine and the motoring pressure, and
   said second modifying means modifies the model equation according to the intake pressure obtained in the vicinity of the start timing of the compression stroke, and calculates the modified estimated motoring pressure using the modified model equation.

4. The in-cylinder pressure detecting apparatus according to claim 3, wherein said engine has at least one fuel injection valve and at least one ignition plug, and said first modifying means performs the modification using the intake pressure obtained at a timing when there is no influence from noises due to fuel injection by said at least one fuel injection valve or noises due to ignition by said at least one ignition plug.

5. The in-cylinder pressure detecting apparatus according to claim 1, wherein said in-cylinder pressure detecting means comprises a pressure detecting element, a charge amplifier for integrating and amplifying an output signal of said pressure detecting element, and a conversion block for converting an output voltage of said charge amplifier to a pressure value,
   wherein said conversion block has a plurality of conversion tables for converting the output voltage of said charge amplifier to the detected in-cylinder pressure, and said sensitivity correcting means selects one of the plurality of conversion tables according to the result of comparing the detected pressure peak value with the estimated motoring pressure peak value.

6. The in-cylinder pressure detecting apparatus according to claim 5, further comprising abnormality processing means for determining that the sensitivity of said in-cylinder pressure detecting means is abnormal if the result of comparing the detected pressure peak value with the estimated motoring pressure peak value indicates that the correction using the plurality of conversion tables is impossible, and selecting a conversion table having an average conversion characteristic of the plurality of conversion tables.

7. An in-cylinder pressure detecting apparatus for an internal combustion engine, for detecting an in-cylinder pressure which is a pressure in a combustion chamber of said engine, said in-cylinder pressure detecting apparatus comprising:
   in-cylinder pressure detecting means for detecting the in-cylinder pressure and output the detected in-cylinder pressure;
   motoring pressure estimating means for estimating a motoring pressure corresponding to an in-cylinder pressure when no combustion is performed in said combustion chamber;
   detected pressure peak value obtaining means for obtaining a peak value of the detected in-cylinder pressure as a detected pressure peak value in a predetermined operating condition of said engine;
   estimated motoring pressure peak value calculating means for calculating an estimated motoring pressure peak value which is a peak value of the motoring pressure estimated by said motoring pressure estimating means, the estimated motoring pressure peak value corresponding to the detected pressure peak value; and
   sensitivity correcting means for comparing the detected pressure peak value with the estimated motoring pressure peak value, and performing sensitivity correction of said in-cylinder pressure detecting means based on a result of the comparison,
   wherein the predetermined operating condition is an operating condition in which said engine is rotated at a predetermined high rotational speed without supplying fuel to said engine, and an intake air flow rate of said engine is made maximum upon inspection performed when a vehicle provided with said engine is shipped out from a manufacturing plant of said vehicle.

8. The in-cylinder pressure detecting apparatus according to claim 7, further comprising:
   intake pressure obtaining means for detecting or estimating an intake pressure of said engine;
   first modifying means for modifying the detected in-cylinder pressure according to the intake pressure obtained during the intake stroke of an object cylinder of which the in-cylinder pressure is detected; and
   second modifying means for modifying the estimated motoring pressure used in the sensitivity correction, according to the intake pressure obtained in the vicinity of a start timing of the compression stroke of said object cylinder,
   wherein said detected pressure peak value obtaining means obtains a peak value of the modified detected in-cylinder pressure as the detected pressure peak value, and
   said estimated motoring pressure peak value calculating means calculates a peak value of the modified estimated motoring pressure as the estimated motoring pressure peak value.

9. The in-cylinder pressure detecting apparatus according to claim 8, wherein said motoring pressure estimating means calculates the estimated motoring pressure using a model equation obtained by modeling a relationship between a rotational phase of said engine and the motoring pressure, and
   said second modifying means modifies the model equation according to the intake pressure obtained in the vicinity of the start timing of the compression stroke, and calculates the modified estimated motoring pressure using the modified model equation.

10. The in-cylinder pressure detecting apparatus according to claim 8, wherein said engine has at least one fuel injection valve and at least one ignition plug, and said first modifying means performs the modification using the intake pressure obtained at a timing when there is no influence from noises due to fuel injection by said at least one fuel injection valve or noises due to ignition by said at least one ignition plug.

11. The in-cylinder pressure detecting apparatus according to claim 7, wherein said in-cylinder pressure detecting means comprises a pressure detecting element, a charge amplifier for integrating and amplifying an output signal of said pressure detecting element, and a conversion block for converting an output voltage of said charge amplifier to a pressure value,
   wherein said conversion block has a plurality of conversion tables for converting the output voltage of said charge amplifier to the detected in-cylinder pressure, and said sensitivity correcting means selects one of the plurality of conversion tables according to the result of comparing the detected pressure peak value with the estimated motoring pressure peak value.

12. The in-cylinder pressure detecting apparatus according to claim 11, further comprising abnormality processing means for determining that the sensitivity of said in-cylinder pressure detecting means is abnormal if the result of comparing the detected pressure peak value with the estimated motoring pressure peak value indicates that the correction using the plurality of conversion tables is impossible, and selecting a conversion table having an average conversion characteristic of the plurality of conversion tables.

* * * * *